US007323115B2

(12) United States Patent
Hayakawa et al.

(10) Patent No.: US 7,323,115 B2
(45) Date of Patent: Jan. 29, 2008

(54) SUBSTRATE PROCESSING METHOD AND INK JET RECORDING HEAD SUBSTRATE MANUFACTURING METHOD

(75) Inventors: Kazuhiro Hayakawa, Isehara (JP); Makoto Terui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 344 days.

(21) Appl. No.: 10/777,108

(22) Filed: Feb. 13, 2004

(65) Prior Publication Data

US 2004/0238485 A1 Dec. 2, 2004

(30) Foreign Application Priority Data

Feb. 13, 2003 (JP) ............................ 2003/035029

(51) Int. Cl.
*G01D 15/02* (2006.01)

(52) U.S. Cl. ............................ 216/27; 216/27; 216/37; 216/41; 438/689; 438/700; 438/702; 438/719; 438/723

(58) Field of Classification Search .................. 216/27, 216/37; 438/689, 700
See application file for complete search history.

(56) References Cited

U.S. PATENT DOCUMENTS 5,478,606 A 12/1995 Ohkuma et al.
6,126,271 A * 10/2000 Terui ............................ 347/50
6,245,245 B1 * 6/2001 Sato ............................ 216/27
6,354,696 B1 * 3/2002 Isshiki ......................... 347/54
6,390,606 B1 5/2002 Terui et al.
6,467,884 B1 10/2002 Murooka et al.

FOREIGN PATENT DOCUMENTS

| | | |
|---|---|---|
| JP | 6-286149 | 10/1994 |
| JP | 11-10895 | 1/1999 |
| JP | 11-348290 | 12/1999 |
| JP | 2001-10070 | 1/2001 |

OTHER PUBLICATIONS

J.Rajesh, Wear, vol. 252, pp. 769-776, (2002).*

* cited by examiner

*Primary Examiner*—Duy-Vu N. Deo
*Assistant Examiner*—Maki Angadi
(74) *Attorney, Agent, or Firm*—Fitzpatrick, Cella, Harper & Scinto

(57) ABSTRACT

A substrate (wafer) processing method for producing an ink jet recording head substrate in which the reverse surface thereof, that is, the surface having the larger of the two openings of the ink supply hole, is precisely covered by a protective film to the very edge of the hole, including: a step for forming a protective film on the substrate; a step for etching the surface of the protective film; a step for forming an etching resistant film on the etched surface of the protective film; a step for forming an ink supply hole pattern through the etchant-resistant film and protective film; a step for forming the ink supply hole through the substrate by etching; a step for removing a portion of the protective film left projecting into the ink supply hole while forming the ink supply hole; and a step for removing the etchant-resistant film.

7 Claims, 5 Drawing Sheets

SUBSTRATE PROCESSING METHOD AND INK JET RECORDING HEAD SUBSTRATE MANUFACTURING METHOD

BACKGROUND OF THE INVENTION

Field of the Invention

The present invention relates to a method for processing a substrate and a method for manufacturing a substrate for an ink jet recording head.

An ink jet printing system produces a negligibly small amount of noise during a printing operation, and is capable of printing at a high speed. In addition, it is capable of printing on so-called plain paper, that is, without the need for giving the plain paper a special treatment. Therefore, an ink jet printing system has come to be widely used in recent years.

There are various ink jet recording heads usable with an ink jet recording system. Among these ink jet recording heads, an ink jet recording head of the so-called side shooter type has been well-known, which ejects droplets of liquid, for example, liquid ink, in the direction perpendicular to the surface of the substrate of the ink jet recording head on which the energy generation elements for generating the energy used for ejecting the ink are formed.

Japanese laid-open patent application 6-286149 discloses one of the methods for manufacturing a side shooter ink jet recording head. According to this method, liquid path walls and liquid ejection orifices are formed by forming an ink path mold of dissolvable resin on an ink jet recording head substrate, coating the liquid path mold with a resin, the main ingredient of which is epoxy, and patterning the resin.

Generally, a side shooter head structured so that its ink supply hole for providing ink to the ink paths, in which the energy generation elements are disposed, penetrates from one surface of the substrate, which supports the energy generation elements, to the other. One of the methods for forming this ink supply hole is an anisotropic etching method. When a silicon substrate (wafer), the crystal orientation planes of which are (100) and (110), is chemically etched with the use of alkaline solution from the directions of the planes (100) and (110), the rate at which the etching process progresses against the plane (111) is extremely small relative to the rates at which the etching process progresses against other planes. In other words, the rate at which the silicon substrate is etched is affected by the crystal orientation of the silicon substrate. That is, the rate at which the silicon substrate is etched in the depth direction of the ink supply hole, or the thickness direction of the substrate, becomes different from the rate at which the substrate is etched in the width direction of the ink supply hole.

For example, when a silicon substrate having a crystal orientation plane of (100) is etched from the direction of the plane (100), the depth to which the substrate is etched is determined by the width by which the substrate is etched. Therefore, the depth of the ink supply hole, on the side from which the etching is started, can be controlled by controlling the width of the surface area of the substrate, across which the etching is started. More specifically, a hole (ink supply hole), the internal surface of which is tilted at 54.7° is formed so that the cross section of the hole, parallel to the surfaces of the substrate, is gradually reduced from the substrate surface from which the etching is started toward the surface opposite thereto. In other words, the depth of the ink supply hole, on the side from which the etching is to be started, and the depth of the ink supply hole, on the side opposite therefrom, can be easily controlled by taking into consideration the thickness of the substrate and the width by which the substrate is etched.

Generally, in a chemical etching method such as the above described one in which an alkaline solution is used, an object to be etched is etched for a relatively long time with the use of a strong alkaline solution, and also, the solution is heated. Therefore, a dielectric film such as a silicon oxide film has been used as the material for an etching mask.

Japanese laid-open patent application 2001-10070 proposes a method for making it difficult for pinholes to grow through a mask during an anisotropic etching operation. According to this method, polyether amide film is used as the material for a mask for patterning the silicon oxide film, and hydrofluoric acid, or a mixed solution of hydrofluoric acid and ammonium fluoride, is used as etching liquid. Further, two films, that is, a silicon oxide film and a polyether amide film, are used as the materials for masks used for anisotropically etching a silicon substrate.

Japanese laid-open patent application 11-348290 discloses another substrate processing method. According to this method, polyether amide film is formed as a layer for forming a seal between a nozzle formation member and a substrate. More specifically, the polyether amide film is solvent coated, and the solvent is evaporated by heating the coating at a temperature no less than the glass transition point (230° C.) of polyether amide in order to reduce the internal stress of the polyether amide layer, since the polyether amide is thermoplastic.

However, when forming the ink supply hole through a silicon substrate with the use of an anisotropic etching method, etching progresses not only in the depth direction of the ink supply hole, which is equivalent to the thickness direction of the substrate, but also in the direction perpendicular to the thickness direction of the substrate, or the width direction of the hole (which hereinafter will be referred to as "side etching"). Therefore, the silicon oxide film which functions as a mask for protecting silicon as the material for the substrate will be left partially projecting into the ink supply hole after the formation of the hole. This portion of the silicon oxide film projecting into the ink supply hole can break off and turn into debris during the subsequent ink jet recording head manufacturing steps and usage of the finished product, for example, while an ink jet recording head is assembled, while an ink jet recording head is packaged, and also, while an ink jet recording head is used.

As a solution to the above described problems, Japanese laid-open patent application 11-010895 proposes a substrate processing method according to which only the portion of the silicon oxide film projecting into the ink supply hole is removed, while leaving intact the portion of the silicon oxide film covering the reverse surface of the substrate, by etching the silicon oxide film for a proper (precise) length of time, with the use of hydrofluoric acid, or a mixed solution of hydrofluoric acid and ammonium fluoride. However, this method is also problematic in that it is very difficult to properly control the length of etching time.

The present invention was made in consideration of the above described problems, and its primary object is to provide an ink jet recording head substrate in which the substrate surface, on the side from which the ink supply hole is formed, is precisely covered with protective film, to the very edge of the hole. Another object of the present invention is to provide an ink jet recording head substrate processing method, the use of which for manufacturing an ink jet recording head substrate can reduce the ratio at which defective ink jet recording heads are manufactured, in order to provide an ink jet recording head capable of forming a high quality image, and to reduce ink jet recording head cost.

SUMMARY OF THE INVENTION

The present invention relates to a substrate processing method characterized in that it comprises: a step for forming a protective film on the substrate; a step for etching the surface of the protective film; a step for forming an etchant-resistant film on the etched surface of the protective film; a step for forming an ink supply hole pattern through the etchant-resistant film and protective film; a step for forming the ink supply hole through the substrate by etching; a step for removing the portion of the protective film left projecting into the ink supply hole while forming the hole; and a step for removing the etchant-resistant film.

The present invention also relates to a manufacturing method for an ink jet recording head substrate, in which the hole for supplying liquid is formed in a manner of penetrating the substrate, and on which the energy generation elements for generating the energy for ejecting liquid are disposed, characterized in that it comprises: a step for forming a protective film on the surface of the substrate opposite to the surface on which the energy generation elements are present; a step for etching the surface of the protective film; a step for forming an etchant-resistant film on the etched surface of the protective film; a step for forming an ink supply hole pattern through the etchant-resistant film and protective film; a step for forming the ink supply hole through the substrate by etching through the ink supply hole pattern; a step for removing the portion of the protective film left projecting into the ink supply hole while forming the hole; and a step for removing the etchant-resistant film.

With the application of the present invention, it becomes possible to provide an ink jet recording head substrate in which the surface which is on the side from which the ink supply hole is formed is precisely covered with a protective film. Further, manufacturing an ink jet recording head with the use of an ink jet recording head substrate manufactured with the use of the substrate processing method in accordance with the present invention makes it possible to increase the degree of adhesion between the protective film and the etchant-resistant film, preventing thereby the etchant-resistant film from exfoliating or floating away from the protective film. Therefore, it becomes easier to control the process for removing the portion of the protective film projecting into the ink supply hole.

Also with the application of the present invention, not only can the etchant-resistant film be made to better function as the etching mask for the protective film, but also the protective film can be made to better function as the etching mask for the substrate. Further, the etchant-resistant film can be made to better function as the protective film for the reverse surface of the substrate. As a result, it is possible to reduce the ratio at which defective ink jet recording heads are manufactured, making it possible to manufacture an ink jet recording head capable of forming a high quality image, and to reduce head cost.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Figure 1A:
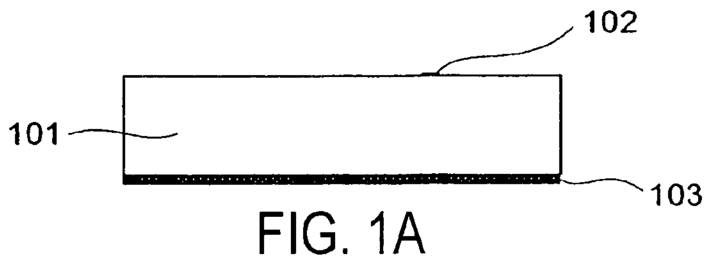
FIGS. 1A-1F are schematic drawings showing the method, in accordance with the present invention, for manufacturing an ink jet recording head substrate.

The present invention is applicable not only to an ink jet recording apparatus, or a recording apparatus which uses ink, but also to an apparatus for ejecting various liquids onto specific points of various surfaces. Hereinafter, however, the present invention will be described with reference to an apparatus which ejects ink.

As an energy generation element, an electrothermal transducer element or a piezoelectric element is usable. When using an electrothermal transducer element as an energy generation element, ink is given thermal energy from the electrothermal transducer element in order to generate bubbles in the ink, and ink is ejected by the pressure from the bubbles. When using a piezoelectric element as an energy generation element, ink is ejected by the mechanical energy from the piezoelectric element.

Processing a substrate with the use of one of the methods in accordance with the present invention for processing a substrate makes it possible to increase the degree of tightness with which the silicon oxide film as a protective film and the polyether amide film as an etchant-resistant film formed on the protective film are adhered to each other, in order to prevent the etchant-resistant film from exfoliating and/or floating away from the protective film, during various manufacturing steps. Therefore, such a substrate processing method makes it easier to control the step in which the portion of the silicon oxide film as the protective film left projecting into the ink supply hole after the formation of the hole is removed. Also, it makes it possible to make the etchant-resistant film better function as the mask for etching the protective film, and also, the protective film to better function as the mask for etching the substrate. Further, it makes the etchant-resistant film better function as the protective film for the reverse surface of the substrate.

When a multipurpose semiconductor manufacturing apparatus is used to manufacture an ink jet recording head having energy generation elements, driving circuits therefor, and the like, foreign substances sometimes adhere to the protective film on the reverse surface of the substrate, while the substrate is conveyed from the apparatus for performing one manufacturing step to the apparatus for performing another manufacturing step. If an etchant-resistant film is formed on an area of the protective film on which foreign substances have adhered, the etchant-resistant film sometimes exfoliates and/or floats away from the protective film, starting from where the foreign substances are present. The process in accordance with the present invention for cleaning a protective film is extremely effective for cleaning the surface of the protective film, that is, for removing foreign substances on the protective film which possibly will trigger the exfoliation and/or floating away of the etchant-resistant film from the protective film.

Further, the removal of the foreign substances on the surface of the protective film reduces the overall thickness of the protective film, reducing thereby the time required to etch the protective film, with the presence of the etchant-resistant film thereon, and the time required to remove the protective film. Therefore, it reduces the length of time the etchant-resistant film is subjected to these processes, reducing thereby the possibility that the etchant-resistant film will exfoliate and/or float. As a means for preventing the etchant-resistant film from exfoliating and/or floating away, it is also possible to use a substrate which is thinner but not thin enough to be substantially lower in strength and break in a manufacturing step, or to make a substrate thinner by polishing the substrate, or etching the substrate with the use of acid, before forming the protective film on the reverse surface of the substrate. These means can also reduce the time necessary to form the ink supply hole by etching, reducing thereby the length of time the etchant-resistant film is exposed to alkaline etching liquid.

Hereinafter, the steps in the preferred method in accordance with the present invention for processing a substrate in order to manufacture an ink jet recording substrate will be described with reference to the appended drawings.

FIGS. 1A-1F are schematic drawings showing the method in accordance with the present invention for manufacturing an ink jet recording head substrate. FIG. 1A shows a step (a) in which a silicon oxide film 103 as a protective film is formed on the reverse surface of a substrate 101 formed of silicon crystal, that is, the surface of the substrate 101 across which the energy generation elements 102 are not present. In order to make it possible to anisotropically etch the substrate 101, a wafer formed of silicon crystal, the crystallographic planes of which are (100) and (110), and the front and reverse surfaces of which are parallel to the crystallographic planes of the silicon crystal, is used as the substrate 101. The thickness of the substrate 101 is chosen in consideration of the strength required of a substrate for an ink jet recording head, the etching rate in anisotropic etching, which will be described later, etc. The silicon oxide film as a protective film is desired to be formed by a thermally oxidizing method, which yields silicon oxide film of good quality. However, it may be formed by CVD, sputtering, or the like.

Figure 1B:
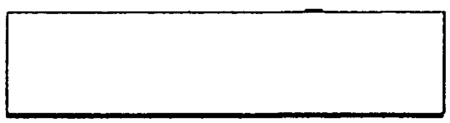

FIG. 1B shows a step (b) in which the surface of the silicon oxide film is cleaned by etching. With regard to this step, the value to which the thickness of the silicon oxide film is to be set so that the cleaned silicon oxide film will properly function as an etchant-resistant film for protecting the reverse surface of the substrate 101 during the anisotropic etching process, which will be described later, is no more than 1,000 nm, preferably, no more than 500 nm. As the foreign substances having adhered to the surface of the silicon oxide film during the formation thereof are removed by etching the surface of the silicon oxide film, not only does the silicon oxide film become uniform in quality, but also, it is improved in surface properties. Etching is more effective for cleaning the silicon oxide film than cleaning it with surfactant.

Next, in the step (c), an etchant-resistant film for protecting the silicon oxide film is formed on the cleaned surface of the silicon oxide film. As a material for this etchant-resistant film, polyether amide resin or the like is usable, which is excellent in terms of resistance to the etching liquid for etching the silicon oxide film and the etching liquid for forming a liquid (ink) supply hole, and also, are excellent in terms of adhesiveness to the silicon oxide film. The film formed of polyether amide resin functions as a very effective etching mask when etching with hydrofluoric acid, a mixture of hydrofluoric acid and ammonium fluoride, or the like. When polyether amide resin is used as the material for the etchant-resistant film, it is solvent coated with the use of an appropriate solvent, and the solvent is evaporated by heating the coated mixture of polyether amide and the solvent to a temperature in the range of 60° C.-350° C., preferably, 320° C.-350° C., in order to form a polyether amide film on the surface of the silicon oxide film. The coating method which uses a solvent makes it possible to simply and evenly coat the polyether amide resin in liquid form. The temperature to which the mixture of the polyether amide resin and the solvent is to be heated to form the polyether amide film is desired to be no less than 230° C., which is the glass transition point of polyether amide resin, and no more than 400° C., at (above) which polyether amide resin will crack. As the polyether amide resin, HIMAL HL-1200 (Hitachi Chemical Co., Ltd.), for example, can be used.

Next, the patterning for forming a hole corresponding to the liquid (ink) supply hole, through the etchant-resistant film is carried out. The method for this pattering is optional; it can be selected in accordance with the material for the etchant-resistant film. If polyether amide resin is used as the material for the etchant-resistant film, the hole is desired to be formed using the following process. That is, a photosensitive resin is coated on the polyether amide film, and the coated surface is exposed to a predetermined pattern. Then, the photosensitive resin is developed to yield a photosensitive resin film having the predetermined pattern. The polyether amide film is etched using, as a mask, this photosensitive resin film having the predetermined pattern. Then, the photosensitive resin is removed.

One of the important points in the present invention is the determination of the step of the ink jet recording head manufacturing process in which the polyether amide resin film should be formed. During the formation of the polyether amide film, the mixture of polyether amide resin and solvent is heated to a temperature no lower than the glass transition point of polyether amide resin, in order to minimize the amount by which stress is generated in the polyether amide resin during the formation thereof, as described above. This heating process is desired to be carried out immediately after the coating of the mixture, that is, without interposing any manufacturing step after the coating of the mixture, in order to prevent the polyether amide resin film from being exfoliated by the internal stress of the polyether amide resin film during the process for manufacturing an ink jet recording head. In other words, the polyether amide film must be formed under such conditions that the coated mixture of the polyether amide resin and solvent can be heated to the above described temperature level.

Polymethyl-isopropenyl-ketone can be listed as one of the resins that can be used as the material for the liquid path mold which can be dissolved away when the ink jet recording head is formed with the use of the method disclosed in aforementioned Japanese Laid-open Patent Application 6-286149. The greater the amount, by which the temperature to which this resin is heated, exceeds 120° C., the harder it becomes for this resin to be dissolved away. Thus, the mixture of polyether amide and solvent is desired to be coated on the protective film and heated, when this resin as the material for the liquid path mold is not on the substrate.

On the other hand, the aforementioned Japanese Laid-open Patent Application 11-348290 discloses an ink jet recording head manufacturing method in which polyether amide is used as the sealing layer between the substrate and liquid path walls. In this case, polyether amide resin is continuously coated on both surfaces of the substrate; more specifically, it is coated on the primary surface (top surface in drawing) of the substrate in order to form the sealing layer, and on the reverse surface (bottom surface in drawing) to form the mask layer for forming the liquid (ink) supply hole. Therefore, the accidental coating of the areas of the surface of the substrate other than the intended areas of the surface does not become fatal, improving thereby the yield. Further, both surfaces of the substrate can be heated at the same time to reduce the internal stress of the polyether amide film. Further, after the formation of the etchant-resistant film on the polyether amide films on both surfaces of the substrate by patterning, the polyether amide films on both surfaces of the substrate can be etched at the same time, making it possible to reduce manufacturing cost. Thus, in the present invention, the polyether amide film is formed before the formation of the liquid path mold of the dissolvable material by patterning.

Figure 1C:
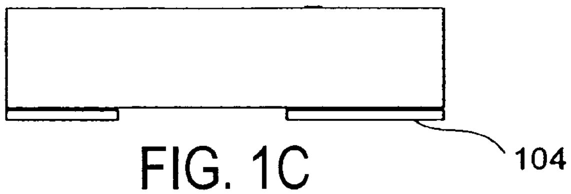

FIG. 1C shows a step (d) in which the hole corresponding to the liquid (ink) supply hole is formed in the silicon oxide film by etching, with the polyether amide film 104 having the hole corresponding to the liquid (ink) supply hole used as the etching mask.

Figure 1D:
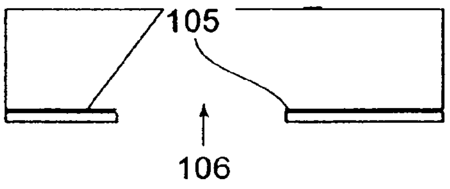

FIG. 1D shows a step (e) in which the ink supply hole 106 is formed by anisotropically etching the substrate through the hole of the silicon oxide film. When forming the ink supply hole through the substrate, the substrate is desired to be anisotropically etched for the following reasons. That is, the rate at which an anisotropic crystalline substance is etched varies depending on the direction in which the substance is etched, relative to the crystal orientation axes. In other words, the relationship between the rate at which an anisotropic crystalline substance is etched in one direction and that in another direction is constant. Therefore, the depth of a hole formed by etching through the substrate can be geometrically controlled by controlling the width of the hole, on the side from which the etching of the hole is started, in consideration of the thickness of the substrate and the width of the hole on the side from which the etching is started. The width of the hole at the reverse surface of the substrate from which the etching is started (longest distance across the hole) is to be chosen in consideration of the properties of the ink jet recording head to be manufactured, thickness of the substrate, etc.

The completion of the formation of the hole by anisotropic etching, or an etching method in which etching progresses in the width direction as well as the depth direction, leaves the edge portion of the hole of the silicon oxide film as an etchant-resistant film projecting into the hole in the substrate as shown in FIG. 1D.

Figure 1E:
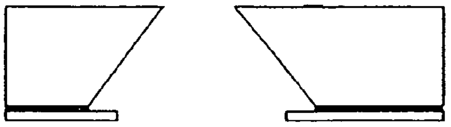

FIG. 1E shows a step (f) in which the above described edge portion of the silicon oxide film projecting into the hole is removed. The polyether amide film as the etchant-resistant film remains on the surface of the silicon oxide film without exfoliating or floating away from the surface, during the above described step (d), etching step (e), and etching step (f). Thus, the etching fluid is allowed to contact only the tip 105 of the projecting edge portion of the silicon oxide film. Therefore, even if the length of time the substrate is kept dipped in the etching liquid is slightly increased to assure that the projecting edge portion of the silicon oxide film will be completely removed, the effect of the etching liquid upon the portion of the silicon oxide film which is desired to be left as a protective film is negligible. Therefore, because the protective film remains precisely covered with the polyether amide film, it is easier to control the manufacturing process. Removing the projecting edge portion of the silicon oxide film as described above prevents the problem that the projecting edge portion of the silicon oxide film breaks, becoming debris, during the ink jet recording head manufacturing steps following the formation of the hole, for example, the assembling process, the packaging process, etc., or while the ink jet recording head is used.

Figure 1F:

FIG. 1F shows the substrate after the polyether amide resin layer 104 as the etchant-resistant film has been removed in a step (g). Through the above described steps, it is possible to yield an ink jet recording head substrate, the edge of the ink supply hole of which, on the reverse side, has no overhanging protective film, and the reverse surface of which is flawlessly covered with a silicon oxide film uniform in thickness.

Thereafter, in order to complete the ink jet recording head, nozzle formation members such as liquid path walls, orifice plate, etc., are formed on the primary surface of the substrate, and then, ejection orifices are formed so that they correspond to the energy generation elements. More specifically, as is well known, first, a liquid path layer having a predetermined shape is formed by the patterning, on the primary surface of the substrate, of a dissolvable resin. Then, a nozzle layer of photosensitive resin, such as photosensitive epoxy resin, photosensitive acrylic resin, etc., is formed on the liquid path layer. Then, the portions of the photosensitive nozzle formation layer, other than the portions to be turned into the ejection orifices which will be connected to the liquid paths, are hardened by exposing them to light, creating the orifice plate. Then, the dissolvable resin layer is dissolved away, leaving thereby holes as liquid paths. These steps for forming the ejection orifices and liquid paths on the primary side of the substrate may be carried out all at once after the above described step (g), or before any one of these steps. Further, they may be separately carried out prior to one or more of these steps. In these steps, the primary side of the substrate is to be covered with a protective agent to protect the primary side from the process for etching the substrate from the reverse side.

The following supplemental description of the manufacturing steps described above is to be noted:

As the method for etching the silicon oxide film, or removing the projecting edge portion thereof, in at least one step among the steps (b), (d), and (f), one of the known wet etching methods is suitable. A wet etching method which uses alkaline liquid can quickly remove the silicon oxide film. However, a wet etching method which uses hydrofluoric acid, or a mixture of hydrofluoric acid and ammonium fluoride is preferable.

If polyether amide is used as the material for forming the etchant-resistant film, in at least one of the steps (c) and (g), a chemical dry etching method is preferable as the method for removing the etchant-resistant film. As the gas to be used for such an etching method, a mixed gas, at least one of the main ingredients of which is oxygen or tetrafluorocarbon, is desired.

As the etching fluid to be used for anisotropically wet etching the substrate in step (e), at least one in the group of hydrazine, water solution of KOH, water solution of TMAH (tetramethyl ammonium hydroxide), and EPW (ethylenediamine-pyrocatechol-water) is desired. Such etching liquids are effective for anisotropic etching. When using only the water solution of TMAH as the etching liquid, the concentration thereof is desired to be no less than 15% and no more than 30%, by mass. The etching temperature is desired to be in the range of 70° C.-90° C. When these conditions are satisfied, etching creates a hole with a smooth surface (111). Creating a hole with smooth surfaces, as the ink supply hole, is desirable because the amount by which the substrate dissolves into ink from smooth surfaces thereof, when alkaline ink is used, is substantially smaller than the amount by which the substrate will dissolve into ink from rough surfaces thereof when alkaline ink is used.

When an ink jet recording head substrate is manufactured by the above described steps, the problem that the silicon oxide film used as the etchant-resistant film for forming the ink supply hole is left projecting into the ink supply hole does not occur. Therefore, when this substrate having no silicon oxide film projection which could turn into debris is used for manufacturing an ink jet recording head, it is possible to manufacture an ink jet recording apparatus which is excellent in ink ejection properties, being therefore capable of forming a high quality image.

Next, an ink jet recording head manufacturing process in which the silicon oxide film as a protective film is not etched will be described as a comparative example of an ink jet recording head manufacturing process, with reference to FIGS. 3A-3E.

Figure 3A:
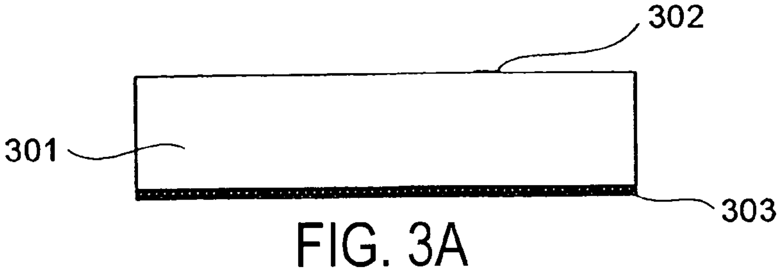
FIGS. 3A-3E are schematic drawings showing Comparative Method 1 for manufacturing an ink jet recording head substrate.

FIG. 3A shows a silicon substrate 301, on which a silicon oxide film 303 is formed, across the reverse surface thereof, that is, the surface on which energy generation elements 302 are not present.

Figure 3B:
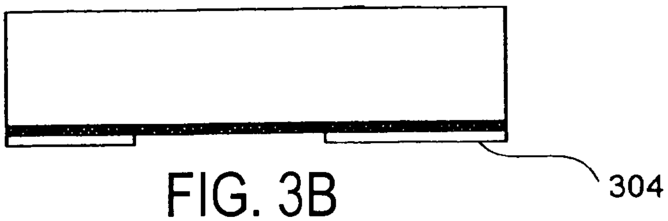

FIG. 3B shows the silicon substrate 301 after a polyether amide film 304 as an etchant-resistant film was formed on the silicon oxide film, the surface of which had not been etched, and a hole for forming an ink supply hole was formed through the polyether-amide film 304 by patterning.

Figure 3C:
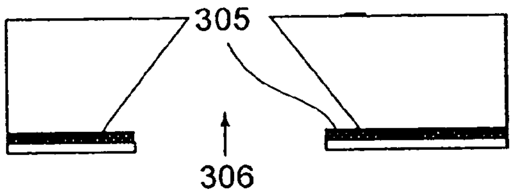

FIG. 3C shows the silicon substrate 301 after a hole for forming the ink supply hole was formed through the silicon oxide film, and the ink supply hole 306 was formed by anisotropic etching, leaving the edge portion 305 of the combination of the silicon oxide film and polyether amide film projecting into the ink supply hole 306, as a result of the progression of the anisotropic etching in the direction parallel to the surfaces of the substrate 301.

Figure 3D:
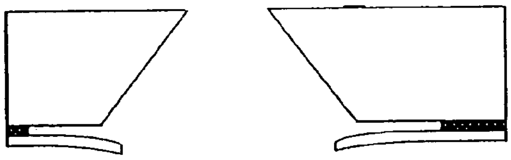

FIG. 3D shows the silicon substrate 301, the silicon oxide film on which was removed from a wide area of the reverse surface of the substrate 301 surrounding the ink supply hole 306, by the etching liquid used for removing the portion 305 of the silicon oxide film projecting into the ink supply hole 306, because the polyether amide film exfoliated from the silicon oxide film, particularly from the area of the silicon oxide film around the ink supply hole 306, and the etching liquid entered between the polyether amide film and silicon oxide film.

Figure 3E:
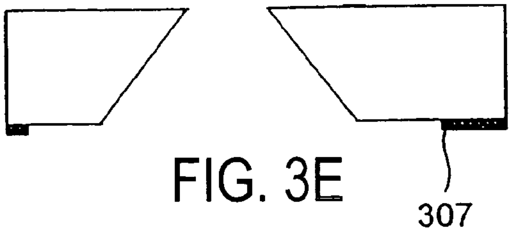

FIG. 3E shows the silicon substrate 301 having a step 307 which resulted because of the unintended removal of a portion of the silicon oxide film other than the portion projecting into the ink supply hole 306. This step 307 allows water, used during a dicing process, to seep, while carrying debris therewith, into unintended areas, along the step 307, creating problems. Further, the removal of the silicon oxide film exposes the substrate surface, the crystallographic plane of which is not (111), depending on the condition under which the silicon substrate was manufactured. For example, if a wafer, the crystal orientation plane of which is (100), is used as the substrate, the surface parallel to the crystallographic plane (100) is exposed. If an ink jet recording head substrate in this condition is pasted to a chip plate for forming the ejection orifices and liquid paths, to manufacture an ink jet recording head, ink will come into contact with the portion of the substrate not coated with silicon oxide film, depending on the level of accuracy with which the substrate is pasted to the chip plate. This surface is less resistant to alkaline liquid compared to the surface, parallel to the crystallographic plane (111), of the ink supply hole of the substrate formed by anisotropic etching. Thus, if a substantial number of areas of the internal surfaces of the ink supply hole and ink paths of an ink jet recording head, which come into contact with ink, are parallel to the crystallographic plane (100), the amount by which the silicon will dissolve into the ink is not negligible, making it possible for the ink jet recording apparatus to be reduced in quality, in consideration of the fact that ink that contains alkaline solution may be used.

EMBODIMENT

Embodiment 1

FIGS. 2A-2E show the ink jet recording head manufacturing steps in the first embodiment of the present invention.

Figure 2A:
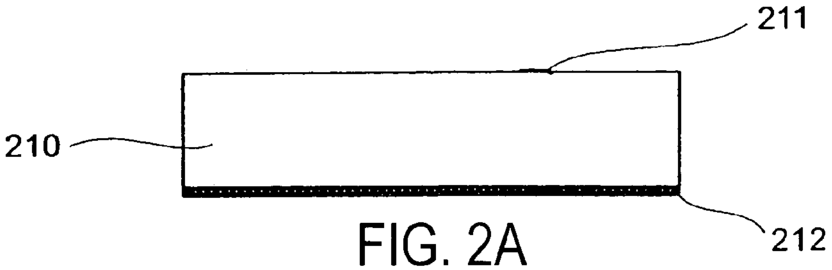
FIGS. 2A-2E are schematic drawings showing the method, in the first embodiment of the present invention, for manufacturing an ink jet recording head.
Figure 2B:

As the substrate 210, a 625 μm thick silicon wafer, which is formed of silicon crystal, the crystallographic plane of which is (100), and the surfaces of which are parallel to the crystallographic plane of the silicon crystal, was used. In this embodiment, a large number of ink jet recording head substrates shown in FIGS. 2A-2E are formed on each of five pieces of the aforementioned silicon wafer, using a general purpose semiconductor manufacturing process. On the primary surface (top surface in drawing) of each substrate 210, heat generating resistor 211 as energy generation elements, driving circuits therefor (unshown), and electrodes for externally supplying the heat generating resistors 211 and driving circuits therefor with signals and electric power, were formed. On the surface of the substrate 210, opposite to the surface having the heat generating resistors 211, that is, the reverse surface (bottom surface in the drawing), a 700 nm thick silicon oxide film 212 as a protective film was formed by a steam oxidization method during the formation of the insulating separation film, in the MOS formation process (FIG. 2A).

The surface of the substrate on which the heat generating resistors and driving circuits therefor were formed was coated, for protection, with positive resist (OFPR-800 (commercial name): Tokyo Oka Co.) to a thickness of 7 μm. The portions of the substrate which create problems if they come into contact with etching liquid should be prevented from coming into contact with etching liquid, by means of a jig comprising an O-ring, rubber resist, or the like.

Figure 6:
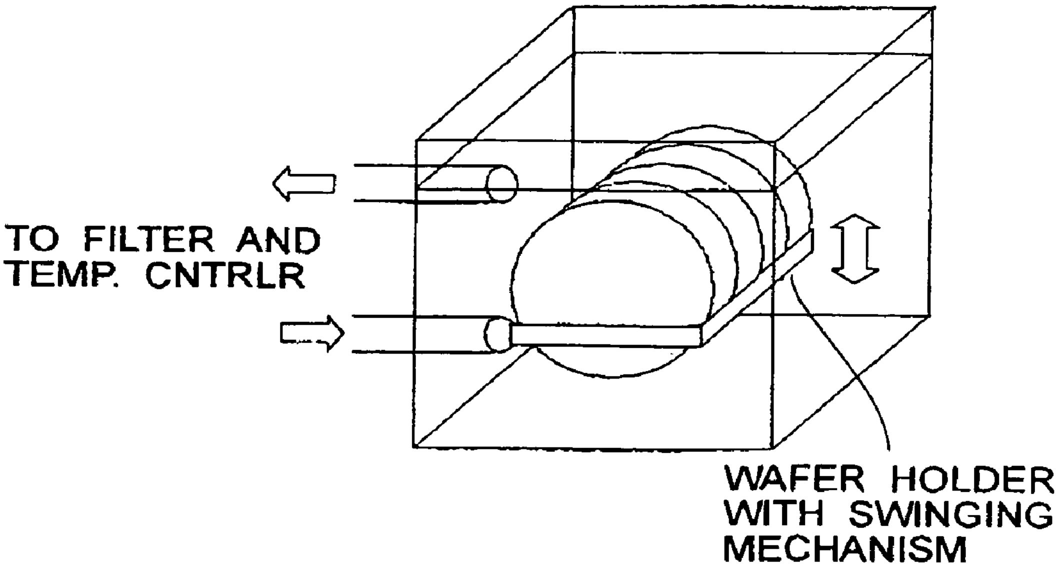
FIG. 6 is a schematic drawing showing the positioning of a wafer in the etching bath, in the ink jet recording head substrate processing method in the first embodiment and the comparative method.

The five wafers, across which a large number of the above described ink jet recording head substrates had been formed, were placed in an automatic etching bath comprising a wafer shaking mechanism, as shown in FIG. 6. The bath was filled with mixture of hydrofluoric acid with a concentration of 16% by mass and hydrofluoric ammonium with a concentration of 27% by mass. The wafers were left in the bath for four minutes at room temperature, to clean the surface of the silicon oxide film by etching it. Then, they were thoroughly cleaned with water, and then, dried. The etching fluid used for this process is desired to contain hydrofluoric acid. The concentration thereof does not need to be limited to the above described one. Further, the etching fluid may contain a surfactant or the like, which has cleaning effects.

After the separation of the positive resist (FIG. 2B), both the primary and reverse surfaces of the substrate (wafer) were coated with polyether amide resin, by a spin coating apparatus. Then, the substrate (wafer) was baked at 250° C., forming thereby a thin film of polyether amide on both surfaces. Then, both surfaces were coated with positive resist to a thickness of 7 μm for the second time. Next, the positive resist layer on the primary surface, or the surface with the heat generating elements and driving circuits therefor, was patterned by a photolithographic technique to leave the positive resist across the areas in which the polyether amide is to be left as a sealing layer.

On the other hand, the positive resist on the reverse surface of the substrate was patterned so that the polyether amide film as the etching resistant film will be patterned as the mask for forming the ink supply hole. Next, the polyether amide films on both the primary and reverse side of the substrate were patterned at the same time by chemical dry etching using a mixture of $CF_4$ and $O_2$ gases.

Next, a polymethyl-isopropenyl-ketone layer 213, that is, the liquid path formation material which would be dissolved away in a later process, was coated, and patterned (exposed to UV rays and developed). Then, it was coated with a cationic polymerization epoxy resin layer 214, and then, was developed, yielding thereby a nozzle plate having a plurality of liquid ejection orifices.

Next, cyclized rubber 215 was coated on the primary surface and the adjacencies thereof to a thickness of 50 μm, in order to protect the nozzle plate on the primary surface of the substrate. Then, the substrate (wafer) was baked at 100° C.

Then, the wafers on which the plurality of unfinished ink jet recording heads had been formed were placed in the above described automatic processing bath, containing the mixture of hydrofluoric acid and ammonium fluoride as before, and they were kept therein for eight minutes at room temperature, in order to etch the silicon oxide film.

Figure 2C:
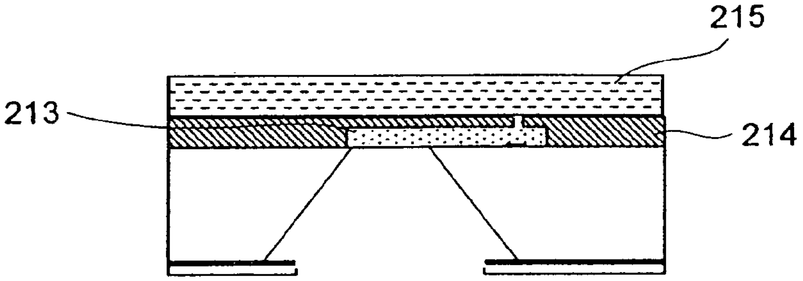

Next, the wafers (substrates) were thoroughly washed with water, and dried. Then, they were dipped in water solution (21 wt. %) of TMAH (tetramethyl ammonium hydroxide) having a temperature of 83° C., and kept therein for 16 hours to allow the wafers (substrates) to be anisotropically etched to form the ink supply holes (FIG. 2C).

Figure 2D:
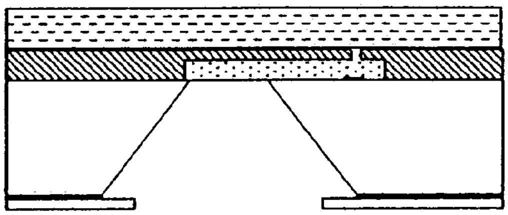

Next, the substrates (wafers) through which the ink supply holes had been formed were dipped in the mixture of hydrofluoric acid and ammonium fluoride similar to the above described mixture, and kept therein for 12 minutes to remove the portions of the silicon oxide film which had been left projecting into the ink supply holes as the anisotropic etching progressed in the direction perpendicular to the thickness of the substrates (FIG. 2D).

Thereafter, the polyether amide film was removed by chemical dry etching using a mixture of $CF_4$ and $O_2$ gases. After removal of the polyether amide film, the width of the opening of the ink supply hole on the reverse side of the ink jet recording head substrate was 1,000 μm, and that on the primary side was 130 μm.

Figure 2E:
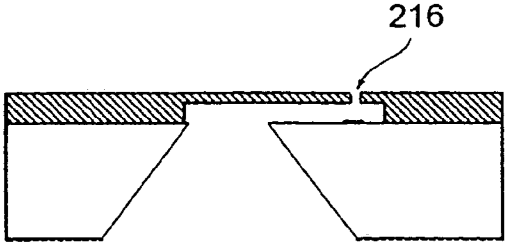

Thereafter, the cyclized rubber 215 on the primary surface and its adjacencies was removed with xylene. Then, the entirety of the polymethyl-isopropenyl-ketone layer 213 as the liquid path formation material on the primary side of the substrate was exposed to UV rays. Then, the substrates (wafers) were dipped into methyl lactate, dissolving away the liquid path formation material (FIG. 2E).

Lastly, the wafers were diced by a dicer to separate the plurality of ink jet recording heads.

(Comparative Process 1)

In the comparative ink jet recording head manufacturing process, the silicon oxide film as a protective film was not etched.

Five wafers, across the surfaces of which a 4700 Å thick silicon oxide film had been formed to make the silicon oxide film uniform in thickness after the cleaning-by-etching step in the first embodiment, were prepared. Otherwise, that is, except for the fact that the surface of the silicon oxide film was not etched for cleaning, this process was the same as the process in the first embodiment. Using this process, ink jet recording heads were manufactured under the same conditions as those in the first embodiment.

The ink jet recording heads manufactured using the ink jet recording head manufacturing processes in the first embodiment and the comparative process were examined in terms of the condition of the silicon film on the reverse surface of the substrate, and also, were subjected to printing tests.

(Surface Examination)

The reverse surfaces of the ink jet recording heads were examined with the use of a metallurgical microscope. The results are given in Table 1. In the table, "wafer position in bath" means the position, relative to the bath, of the wafer in the automatic etching bath having a wafer shaking mechanism, shown in FIG. 6.

TABLE 1

| | CONDITION OF SILICON OXIDE FILM IN ADJACENCIES OF INK SUPPLY HOLE | | | | | |
|---|---|---|---|---|---|---|
| WAFER POS. IN BATH | NEAR EDGE | NEAR EDGE | NEAR EDGE | NOT NEAR EDGE | NOT NEAR EDGE | NOT NEAR EDGE |
| HEAD POS. IN WAFER | OUTER-MOST | NEAR EDGE | CENTRAL | OUTER-MOST | NEAR EDGE | CENTRAL |
| EMB. 1 | G | G | G | G | G | G |
| COMP. 1 | NG | NG | G | NG | G | G |

Figure 4:
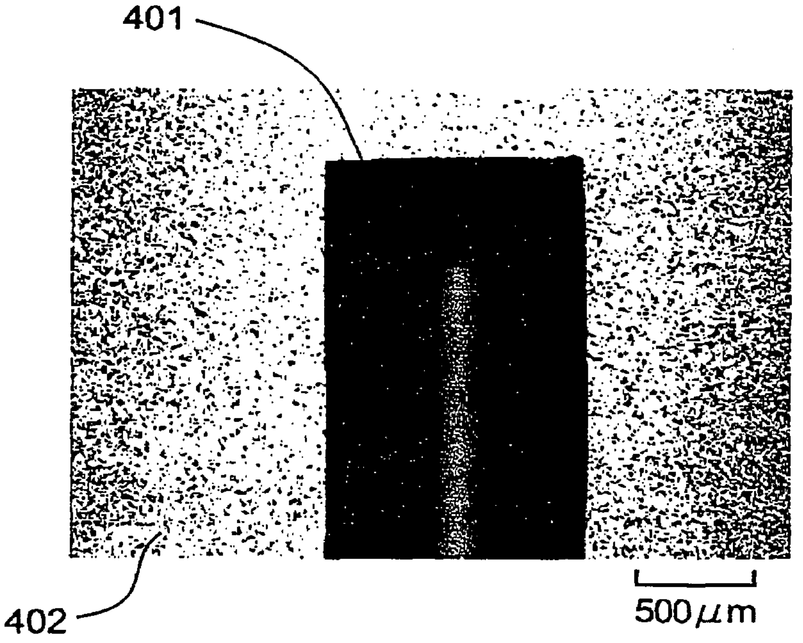
FIG. 4 is a photograph of the reverse side of an ink jet recording head manufactured using the ink jet recording head manufacturing method in the first embodiment of the present invention.
Figure 5:
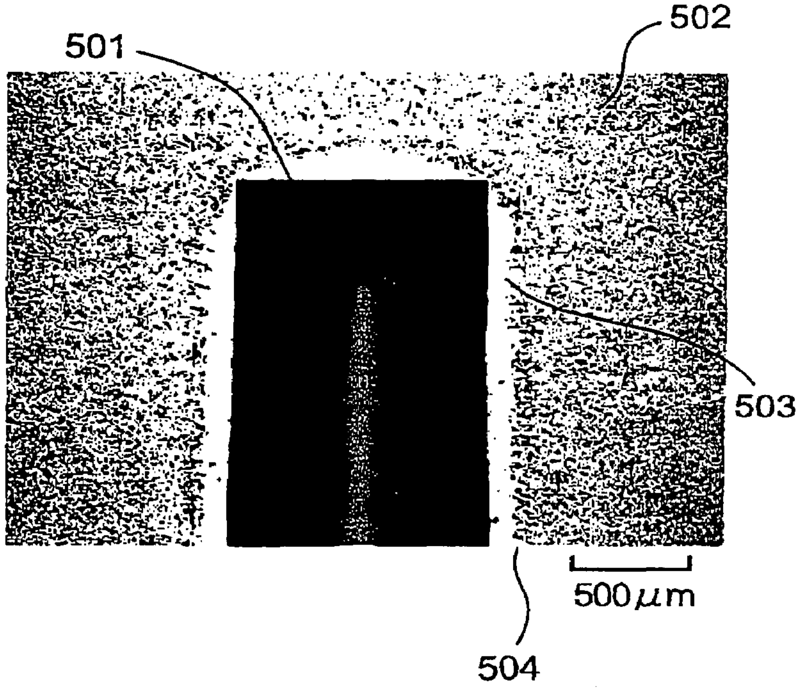
FIG. 5 is a photograph of the reverse side of the ink jet recording head manufactured using the comparative ink jet recording head manufacturing method.

FIG. 4 is a photograph of the reverse side of a typical ink jet recording head evaluated as G (good) in Table 1, and FIG. 5 is a photograph of the reverse side of a typical ink jet recording head evaluated as NG (not good) in Table 1. In the case of an ink jet recording head having the evaluation mark of G, the silicon oxide film 402 remains on the reverse surface of the substrate in such a condition that it uniformly covers the surface of the substrate to the very edge of the ink supply hole 401 as shown in FIG. 4. In comparison, in the case of the ink jet recording head evaluated as NG in Table 1, the silicon oxide film 502 has been removed from the adjacencies 503 of the ink supply hole 501, creating thereby a step 504 between the surface portion covered with the silicon oxide film and the surface portion having no silicon oxide film. Thus, such a problem that the substrate (formed of silicon) dissolves into ink from the adjacencies of the ink supply hole, which are not covered with the silicon oxide film, might occur.

Figure 7:
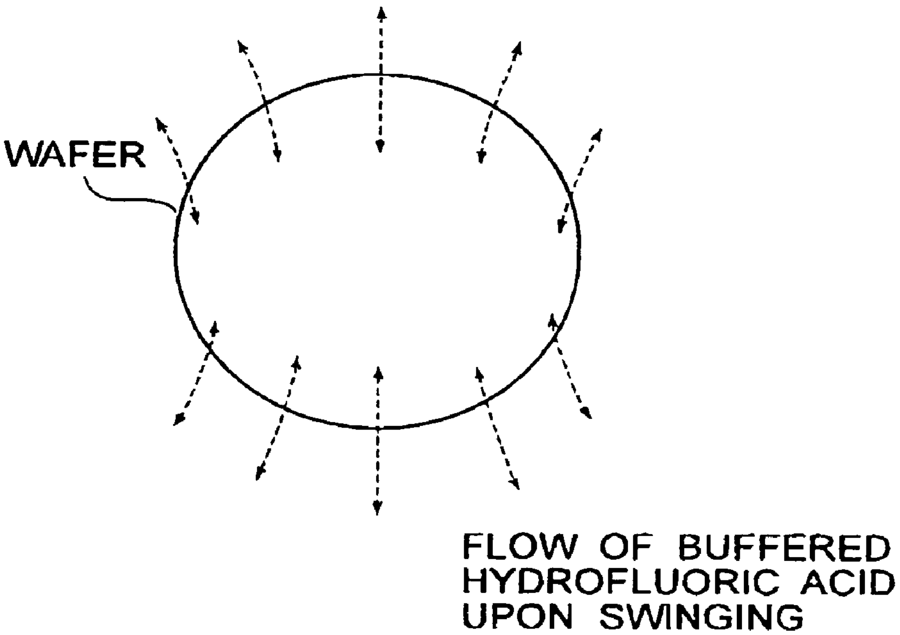
FIG. 7 is a schematic drawing showing the directions in which the etching fluid flows toward, or away from, the wafer in the etching bath shown in FIG. 6.

As will be evident from Table 1, in the case of the comparative ink jet recording head manufacturing process 1, the ink jet recording heads given the evaluation of NG were from the peripheral and near-peripheral portions of the wafer which was closer to the end portions of the bath, in terms of the direction perpendicular to the wafers (substrates). Further, the ink jet recording heads from the peripheral portion of the wafer which was in the center portion of the bath was also given the evaluation of NG. This occurred for the following reasons (refer to FIG. 7). That is, one of the surfaces of the wafer(s) at the end(s), in terms of the direction perpendicular to the wafers, was not covered with another wafer, being thereby constantly supplied with a fresh supply of the mixture of the hydrofluoric acid and ammonium fluoride solutions. Therefore, the rate at which these wafers was etched increased, causing thereby the polyether amide film as the etching resistant film to float from the silicon oxide film. Further, regarding each wafer, the closer to the periphery of the wafer the given area of the wafer, the greater the amount by which the mixture of the hydrofluoric acid solution and ammonium fluoride solution is supplied thereto, and therefore, a phenomenon similar to that which occurred to the end wafer occurred to the peripheral area of the wafers in the center portion of the bath. In this embodiment, the wafers were shaken in the automatic etching bath. The occurrences and extent of these phenomena can be controlled to a certain degree by the provision or non-provision of the shaking, or improving the manner in which the wafers are shaken. In addition, it is possible to modify the automatic etching bath in structure; for example, providing the bath with a liquid circulating mechanism, or eliminating it therefrom, changing the positions of the inlet and/or outlet of the etching liquid, etc. However, in using the automatic etching bath, it is virtually impossible to expose all the surfaces of all the wafers to the etching liquid to an absolutely uniform degree.

In comparison, in the case of the first embodiment, even when the etching process progressed nonuniformly, the polyether amide film did not float away from the surface of the substrate of any of the ink jet recording heads, because the degree of adhesion between the polyether amide film as the protective film, that is, the etchant-resistant film, and the silicon oxide film was substantially higher. As a result, all the ink jet recording heads manufactured by the ink jet recording head manufacturing process of the first embodiment received the evaluation of G.

(Printing Tests)

The ink jet recording heads manufactured by the ink jet recording head manufacturing processes in the first embodiment and the comparative process 1 were kept in storage, being left unattended, for one month. Then, they were mounted in an ink jet printer (BJ-F900 (commercial name): Canon Inc.), and were subjected to printing tests, in which the images formed by these ink jet recording heads were examined with the naked eye. Those which produced excellent images were given the evaluation of G, whereas those which produced images with a certain amount of anomalies were given the evaluation of NG. The results are given in Table 2.

TABLE 2

EVALUATIONS OF INK JET RECORDING HEADS IN PRINT QUALITY

| WAFER POS. IN BATH | NEAR EDGE | NEAR EDGE | NEAR EDGE | NOT NEAR EDGE | NOT NEAR EDGE | NOT NEAR EDGE |
|---|---|---|---|---|---|---|
| HEAD POS. IN WAFER | OUTER-MOST | NEAR EDGE | CENTRAL | OUTER-MOST | NEAR EDGE | CENTRAL |
| EMB. 1 | G | G | G | G | G | G |
| COMP. 1 | NG | NG | G | NG | G | G |

It is evident from Table 2 that some of the ink jet recording heads manufactured by the comparative process 1 were evaluated as NG in terms of image quality, whereas those manufactured by the process of the first embodiment were all evaluated as G, that is, excellent in image quality. In other words, usage of the ink jet recording head manufacturing process in accordance with the present invention makes it possible to increase the yield of ink jet recording heads of excellent quality, making it thereby possible to reduce ink jet recording head cost.

While the invention has been described with reference to the structures disclosed herein, it is not confined to the details set forth, and this application is intended to cover such modifications or changes as may come within the purposes of improvements or the scope of the following claims.

What is claimed is:

1. A method of manufacturing a substrate for an ink jet recording head, wherein said substrate has a supply port, penetrating said substrate, for supplying liquid and an energy generating element for generating energy for ejecting the liquid, said method comprising:

a step of forming a protecting film on a surface of said substrate which is opposite from a surface on which said energy generating element is disposed;

a step of etching a surface of said protecting film by liquid containing ammonium fluoride to make said protecting film a thin film having a thickness of not more than 500 nm;

a step of forming an etching-resistant film on the thus etched protecting film;

a step of forming opening patterns in said protecting film and said etching-resistant film;

a step of forming an opening as said supply port, in a side of said substrate opposite from a side thereof having said energy generating element, by etching said substrate through said opening patterns;

a step of removing a projected end portion of said protecting film which is projected into said opening and which is produced in said opening forming step; and a step of removing said etching-resistant film after said projected end portion removing step.

2. A method according to claim 1, wherein said substrate comprises silicon.

3. A method according to claim 2, wherein said supply port forming step uses crystal anisotropic etching.

4. A method according to claim 1, wherein said projected end removing step uses etching.

5. A method according to claim 1, wherein said protecting film comprises silicon oxide.

6. A method according to claim 1, wherein said etching-resistant film comprises polyetheramide.

7. A method of manufacturing a substrate for an ink jet recording head, wherein said substrate has a supply port, penetrating said substrate, for supplying liquid and an energy generating element for generating energy for ejecting the liquid, said method comprising:

a step of forming a protecting film on a surface of said substrate which is opposite from a surface on which said energy generating element is disposed;

a step of etching a surface of said protecting film by liquid containing ammonium fluoride to make said protecting film a thin film;

a step of forming an etching-resistant film on the thus etched protecting film;

a step of forming opening patterns in said protecting film and said etching-resistant film;

a step of forming, by etching said substrate through the opening pattern, an opening as the supply port in said substrate and a projection comprising the protecting film and the etching-resistant film in the opening;

a step of removing an end of the protecting film while leaving an end of the etching-resistant film, in the projection projecting into the opening and having been formed in a surface opposite from a side having the energy generating element when said opening is formed; and a step of removing said etching-resistant film after said projected end portion removing step.

* * * * *